United States Patent
Hampel et al.

(10) Patent No.: US 10,720,063 B2
(45) Date of Patent: Jul. 21, 2020

(54) METHOD AND SYSTEM FOR OBTAINING AND PRESENTING TURBULENCE DATA VIA COMMUNICATION DEVICES LOCATED ON AIRPLANES

(71) Applicant: Yamasee Ltd., Bet Uziel (IL)

(72) Inventors: Oran Hampel, Aseret (IL); Zivi Nedivi, Tel Aviv (IL); Moshe Shitrit, Ra'anana (IL)

(73) Assignee: Yamasee Ltd., Bet Uziel (IL)

( * ) Notice: Subject to any disclaimer, the term of this patent is extended or adjusted under 35 U.S.C. 154(b) by 376 days.

(21) Appl. No.: 15/547,770

(22) PCT Filed: Jan. 21, 2016

(86) PCT No.: PCT/IL2016/050070
§ 371 (c)(1),
(2) Date: Jul. 31, 2017

(87) PCT Pub. No.: WO2016/125139
PCT Pub. Date: Aug. 11, 2016

(65) Prior Publication Data
US 2018/0268715 A1    Sep. 20, 2018

Related U.S. Application Data

(60) Provisional application No. 62/196,431, filed on Jul. 24, 2015.

(51) Int. Cl.
*G08G 5/00* (2006.01)
*G01W 1/00* (2006.01)

(52) U.S. Cl.
CPC ......... *G08G 5/0008* (2013.01); *G08G 5/0013* (2013.01); *G08G 5/0026* (2013.01); *G08G 5/0091* (2013.01); *G01W 2001/003* (2013.01)

(58) Field of Classification Search
None
See application file for complete search history.

(56) References Cited

U.S. PATENT DOCUMENTS

| 6,285,878 B1 | 9/2001 | Lai |
| 6,590,520 B1 | 7/2003 | Steele et al. |

(Continued)

FOREIGN PATENT DOCUMENTS

| EP | 2693417 | 2/2014 |
| RU | 2200963 | 2/2003 |
| RU | 2469411 | 12/2012 |

OTHER PUBLICATIONS

"WSI Total Turbulence" archived from http://www.wsi.com/products-aviation-commercial-wsi-totalturbulence.htm on Feb. 2, 2015.

(Continued)

*Primary Examiner* — Tuan C To
*Assistant Examiner* — Kelly D Williams
(74) *Attorney, Agent, or Firm* — Pearl Cohen Zedek Latzer Baratz LLP

(57) ABSTRACT

A device, system and method is provided for obtaining and processing turbulence data via communication devices located on-board airplanes. Turbulence data obtained by a plurality of communication devices may be received during flights onboard respective ones of a plurality of airplanes. Turbulence map data may be generated by super-positioning the turbulence data received from the plurality of communication devices onto a single tempo-spatial frame of reference. The turbulence map data may be distributed to one or more of the communication devices. A device, system and method is also provided for generating turbulence map data that may reduce or eliminate "false positive" turbulence events. Turbulence map data may be generated for the airspace region based on a minimum of different turbulence values. The turbulence map data of at least the airspace (Continued)

region may be transmitted to one or more communication devices based on the minimum of the turbulence values.

28 Claims, 9 Drawing Sheets

(56) References Cited

U.S. PATENT DOCUMENTS

| | | | |
|---|---|---|---|
| 6,650,972 | B1 | 11/2003 | Robinson et al. |
| 6,810,527 | B1 | 10/2004 | Conrad et al. |
| 6,813,493 | B2 | 11/2004 | Criqui et al. |
| 6,889,042 | B2 | 5/2005 | Rousseau et al. |
| 7,027,898 | B1 | 4/2006 | Leger et al. |
| 7,400,293 | B2 | 7/2008 | Fleming |
| 7,489,992 | B2 | 2/2009 | Valette et al. |
| 7,612,688 | B1 | 11/2009 | Vigeant-Langlois et al. |
| 7,917,255 | B1 | 3/2011 | Finley |
| 8,094,605 | B2 | 1/2012 | Lynch et al. |
| 8,130,121 | B2 | 3/2012 | Smith et al. |
| 8,131,407 | B1 | 3/2012 | Robinson |
| 8,131,408 | B2 | 3/2012 | Kordt |
| 8,159,369 | B1 | 4/2012 | Koenigs et al. |
| 8,209,071 | B2 | 6/2012 | Ross |
| 8,629,788 | B1 | 1/2014 | Greenleaf et al. |
| 8,907,817 | B1 | 12/2014 | Finley et al. |
| 9,126,696 | B1 | 9/2015 | Hampel et al. |
| 9,325,793 | B1 | 4/2016 | Stone et al. |
| 9,738,400 | B2 | 8/2017 | Dugan |
| 2003/0179727 | A1 | 9/2003 | Soong et al. |
| 2006/0040612 | A1 | 2/2006 | Min |
| 2006/0121893 | A1 | 6/2006 | Tillotson et al. |
| 2006/0238384 | A1 | 10/2006 | Hess et al. |
| 2007/0159383 | A1 | 7/2007 | Fleming |
| 2007/0162197 | A1 | 7/2007 | Fleming |
| 2008/0154446 | A1 | 6/2008 | Rui et al. |
| 2009/0286550 | A1 | 11/2009 | Weinroth |
| 2010/0315265 | A1 | 12/2010 | Smith et al. |
| 2011/0257818 | A1 | 10/2011 | Ganz et al. |
| 2012/0010806 | A1 | 1/2012 | Tseng |
| 2013/0126679 | A1 | 5/2013 | Estkowski et al. |
| 2013/0158751 | A1 | 6/2013 | Cornell et al. |
| 2013/0166113 | A1 | 6/2013 | Dakin et al. |
| 2014/0074326 | A1 | 3/2014 | Pereira et al. |
| 2016/0133137 | A1 | 5/2016 | Rencher et al. |

OTHER PUBLICATIONS

"WSI Total Turbulence Overview" Oct. 2014.
International Search Report and Written Opinion for PCT International Application No. PCT/IL2016/050070 dated Aug. 5, 2016.

METHOD AND SYSTEM FOR OBTAINING AND PRESENTING TURBULENCE DATA VIA COMMUNICATION DEVICES LOCATED ON AIRPLANES

CROSS-REFERENCE TO RELATED APPLICATIONS

This application is a National Phase Application of PCT International Application No. PCT/IL2016/050070 International Filing Date Jan. 21, 2016, entitled "METHOD AND SYSTEM FOR OBTAINING AND PRESENTING TURBULENCE DATA VIA COMMUNICATION DEVICES LOCATED ON AIRPLANES", published on Aug. 11, 2016 as International Patent Publication No. WO 2016/125139, claiming benefit of U.S. patent application Ser. No. 14/615,034 filed Feb. 5, 2015, issued as a U.S. Pat. No. 9,126,696 on Sep. 8, 2015, and U.S Provisional Pat. Application No. 62/196,431, filed Jul. 24, 2015, all of which are incorporated herein by reference in their entireties.

FIELD OF THE INVENTION

Embodiments of the present invention relate generally to the field of crowdsourcing, and more particularly to obtaining turbulence data along flight routes via communication devices.

BACKGROUND OF THE INVENTION

Prior to setting forth the background of the invention, it may be helpful to set forth definitions of certain terms that will be used hereinafter.

The term "turbulence" as used herein refers to a rapid variation of pressure and flow velocity in space and time that affect airplanes during flights. Turbulence affects the comfort of the passengers of the flight and may also affect the safety of the flight. Additionally, turbulence may affect the fuel consumption of the airplane. Clear-air turbulence (CAT) is the turbulent movement of air masses in the absence of any visual cues such as clouds, and is caused when bodies of air moving at widely different speeds meet. Therefore, CAT events are significantly more difficult to detect.

The term "communication device" as used herein refers to any electronic device that is provided with the ability to both transmit and receive data, usually but not exclusively, over a communication network. Communication devices may include user equipment (UE) such as hand-held mobile devices that are not integral to and may be carried onto and off of an airplane including, for example, smartphones, tablet personal computers (PCs), and laptop PCs. User equipment (UE) may be operated for example by a pilot, flight crew member or a passenger, for example, releasable secured to a dashboard mount in the cockpit so that the user equipment has a generally fixed position relative to the airplane. Additionally or alternatively, communication devices may be part of embedded airplane communication systems that are embedded in, inseparably mounted to, or integral to, airplane devices. Embedded airplane communication devices may include, for example, transmitter-responders (transponders), such as mode C transponders or mode S transponders, or Universal Access Transceivers (UATs). Communication devices may include or may be operatively connected to one or more turbulence sensor(s), communication circuit(s) including antenna(e), memor(ies), processor(s), and display(s), any combination of which may be integrated into one housing as a single device, or may be separated into different devices. Data may be transmitted between the user equipment, embedded airplane communication devices, satellites, ground communication devices, or any combination thereof over one or more wireless networks including, for example, radio, satellite, Wi-Fi (e.g. IEEE 802.11 family), cellular such as 3G or long term evolution (LTE), or any combination thereof.

FIG. 1 is a map diagram illustrating turbulence data obtained by forecast models. Map 10 shows areas that are likely to be affected by turbulence. The darker pattern indicates a likelihood of a relatively severe level of turbulence, whereas the lighter pattern indicates a likelihood of a relatively moderate level of turbulence. The data derived from the forecast models may be regularly updated and is typically based on mathematical models. The data may be generated for different timeslots and altitude ranges so that a flight route may be planned and amended accordingly.

These maps are generated via forecast models generally based on weather conditions, but suffer from severe inaccuracies due to the inability to correctly estimate the effect of the various weather conditions on turbulence. First, not all clouds lead to turbulence, and second, various conditions such as clear-air turbulence (CAT) cannot be accurately forecasted. Therefore, currently available solutions for obtaining and presenting turbulence data tend to suffer both from 'no detection' scenarios and 'false alarm' scenarios which generally undermine the reliability of turbulence monitoring.

SUMMARY OF EMBODIMENTS OF THE INVENTION

A device, system and method is provided for generating turbulence map data. Some embodiments of the invention may be used, for example, to generate turbulence map data with fewer or no "false positive" turbulence events.

In accordance with an embodiment of the invention, a plurality of turbulence values may be received that are obtained by one or more airplanes while travelling through a single airspace region within a predetermined period of time. At least two of the turbulence values may be different. Turbulence map data may be generated for the airspace region based on a minimum of the different turbulence values. The turbulence map data of at least the airspace region may be transmitted based on the minimum turbulence values to one or more communication devices.

In accordance with an embodiment of the invention, a turbulence value may be received that is obtained by a first communication device during a flight on-board a first airplane while traveling through an airspace region. Embodiments of the invention may set a predetermined lock-out period of time after the turbulence value is obtained during which the turbulence value may only be decreased, but not increased. During the predetermined lock-out period of time, the turbulence value may be adjusted based on a subsequently received turbulence value obtained by the same or different communication device during a flight on-board the same or different airplane while traveling through the same airspace region if (e.g., and only if) the subsequent turbulence value is less than the turbulence value obtained by the first communication device. Turbulence map data may be transmitted including the turbulence value set for the airspace region to one or more communication devices.

In accordance with an embodiment of the invention, turbulence values may be received that are obtained by a plurality of communication devices during flights on-board the same or different airplanes travelling through a single airspace region within a predetermined period of time. After receiving a first one of the turbulence values, if a subsequently received one of the turbulence values is lower than the first turbulence value, the turbulence value for the airspace region may be set or lowered based on the subsequently received turbulence value, whereas if the first turbulence value is greater than the subsequently received turbulence value, the turbulence value for the airspace region may remain or be set based on the first turbulence value. Turbulence map data of the airspace region may be transmitted to one or more communication devices based on the turbulence value set for the airspace region.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
FIG. 1 is a map diagram illustrating turbulence data obtained by forecast models.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Figure 2:
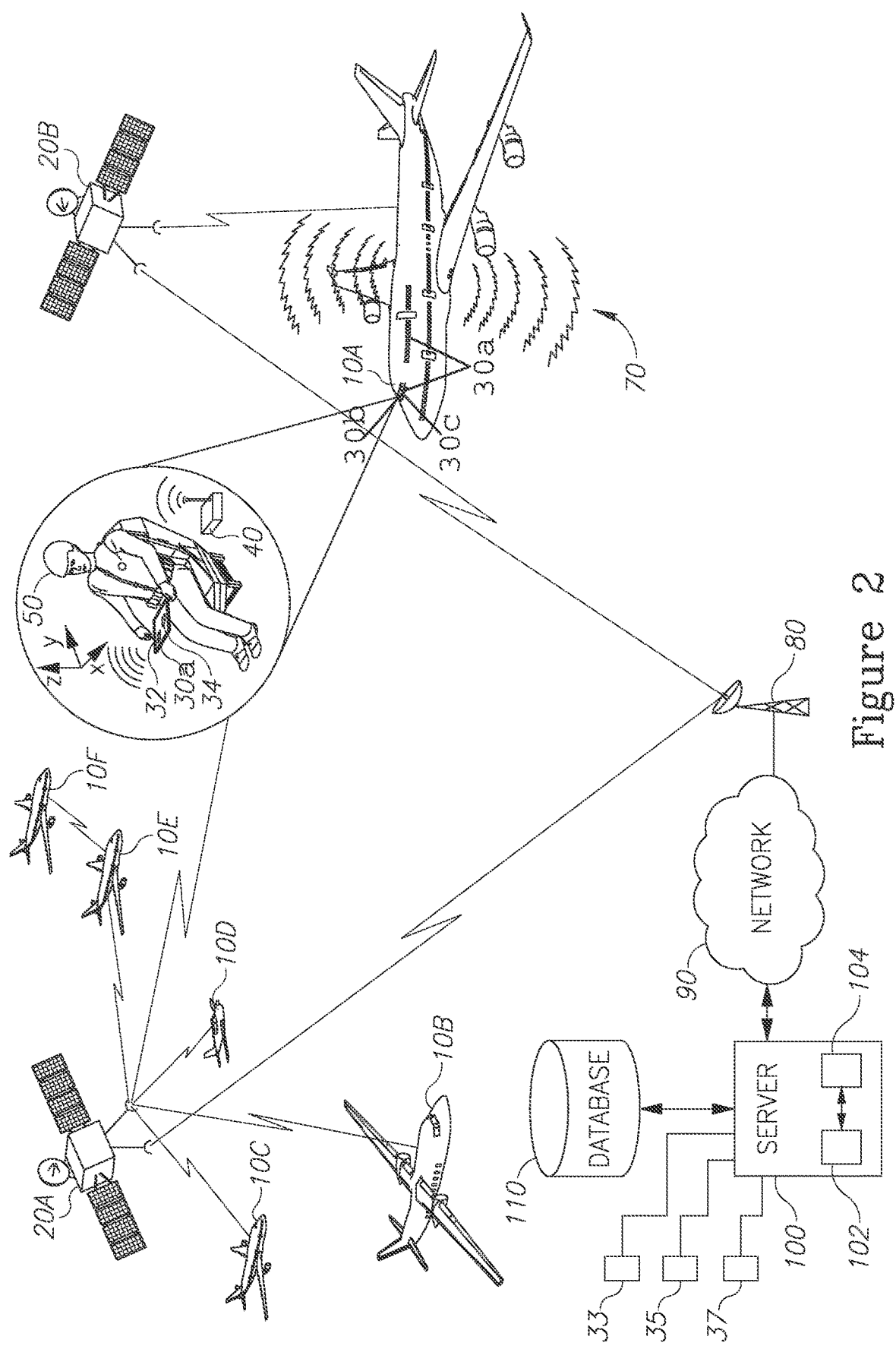
FIG. 2 is a schematic illustration of a system for monitoring turbulence data in accordance with embodiments of the present invention.

FIG. 2 is a schematic illustration of a system for monitoring turbulence data in accordance with embodiments of the present invention. The system may include a plurality of communication devices 30 located respectively on a plurality of airplanes 10A-10F and configured to obtain and transmit turbulence data relating to turbulence 70 affecting the respective airplanes 10A-10F over a communication channel. Communication devices 30 may include or be operatively connected to a sensor or detector such as an accelerometer for collecting and recording turbulence data, a communication circuit having an antenna for communicating with other devices, a memory 32 for storing turbulence data and processing instructions, a processor 34 for executing the instructions, and/or a display for displaying turbulence data or maps. Communication devices 30 may be carried on board an airplane by users or may form an integral part of the airplane in embedded communication systems on board the aircrafts. Communication devices 30 may include, for example, a hand-held mobile device or user equipment, such as a tablet PC held by a user 50 (e.g., a pilot holding or mounting the device on a dashboard). Communication devices 30 may additionally or alternatively be part of an embedded aircraft communication system in one or more of airplanes 10A-10F. Embedded aircraft communication systems may include multiple components (e.g., a transponder such as a mode C transponder or a mode S transponder, Universal Access Transceiver (UAT), memory, processor, display, weather radar, and the like) that may be packed into one housing or embedded in several different locations in the interior or exterior of the airplane.

Communication devices 30 such as hand-held user equipment may communicate via a Wi-Fi access point 40 that may be available continuously or intermittently during a flight of airplane 10A (or after the flight when the plane has landed). Access point 40 may communicate with a communication satellite 20B which in turn transmits the data to a terrestrial station 80 which connect to a remote server 100 over network 90 which may be, but not necessarily, the Internet. Additionally or alternately, communication devices 30 such as transponders embedded in embedded airplane communication systems may transmit turbulence data to ground control devices via radio or satellite. Turbulence data may be transmitted over these communication channels, for example, periodically, when there is a threshold change in detected turbulence values, and/or, if communication is temporarily unavailable, upon reestablishing connectivity.

While most airplanes 10A-10E communicate via a communication satellite 20A, some airplanes such as 10F may communicate (possibly using an inter-airplane communication system) via another airplane 10E which serves as a network node between airplane 10F and communication satellite 20A. Additionally, some communication devices 33, 35, and 37 may be located remotely outside the aircrafts, either as stationary sources of data or terminals (e.g., weather stations, airline operation terminals and/or ground control terminals) on which data is displayed. In some embodiments, turbulence data may be obtained, either manually or automatically, from communication devices 33, 35, and/or 37, for example, as third party sources other than the on-flight communication devices.

Remote server 100 may include a memory 102 or database 110 for storing turbulence data and processing instructions and a processor 104 for executing the instructions. Remote server 100 may he configured to receive the turbulence data from communication devices 30 on board airplanes 10A-10F over the communication channel. Remote server 100 may generate and later update a tempo-spatial turbulence database 110 by super-positioning (or mapping) the turbulence data received from the plurality of communication devices 30 onto a single tempo-spatial frame of reference. Turbulence data may be represented, for example, by values identifying intensity, source of data (manual or automatic), time, and further metadata describing the turbulence data. In some embodiments, each turbulence data sample recorded by communication devices 30 and/or received by remote server 100 may be indexed or identified by coordinates of position and time at which the data was recorded. For example, database 110 may store information representing a four-dimensional data array which maps global positioning system geographic coordinates (x, y), altitude (z), and time (t) into turbulence data. Additionally or alternatively, communication devices 30 may record and remote server 100 may receive a predefined flight trajectory, for example, for each distinct linear or curvilinear flight path with a constant velocity and/or acceleration, and a time at which each record was recorded, from which remote server 100 may calculate the position of each turbulence data sample. Remote server 100 may accumulate and combine readings from different trajectories and from different airplanes, for example, by rotating the axes of each sample set according to each distinct trajectory with respect to a common set of coordinate axes to fit together in a turbulence map or graph.

Remote server 100 may then distribute the accumulated turbulence data stored on the tempo-spatial database 110 to communication devices 30. The distributed data may be provided in various forms of processing. In one embodiment, remote server 100 may distribute an entire set of turbulence data, for example, accumulated from communication devices 30 on all available airplanes 10A-10F or for all available areas, times, and/or altitude ranges. In another embodiment, remote server 100 may only distribute a subset of the turbulence data stored on the database 110, for example, for a subset of airplanes 10A-10F, areas, times, and/or altitude ranges, responsive to a specified request made by one or more communication devices 30, or for only new or changes in turbulence data values. For example, remote server 100 may distribute the subset of turbulence data along the route of the airplane in which the device is located (e.g., which may be predefined and/or updated automatically when rerouted). In other embodiments, remote server 100 may distribute raw turbulence data from other communication devices to communication devices 30, which may then accumulate the received turbulence data with its own stored turbulence data locally. An example of the data structure for storing the turbulence data and a visual representation thereof will be described in further details hereinafter.

Data may be transmitted securely between communication devices 30, access points 40, satellites 20A-20B and/or terrestrial station 80, for example, using data authentication or encryption mechanisms at the sending and/or receiving device, such as, for example, password-protected logins, public and private keys, encryption functions, digital signatures, digital certificates, firewalls or other security mechanisms. In one embodiment, turbulence data may be transmitted in a secure manner using Hypertext Transfer Protocol Secure (HTTPS) or secure sockets layer (SSL) communication (e.g., where HTTPS communication is not available). Upon starting an application, a processor (e.g., processor 34 or 104) may request and receive user login credentials, such as, a user name and password, entered by user 50. In some embodiments, a memory (e.g., memory 32, 102 or database 110) may store a list of one or more user identifications (IDs), device IDs or flight IDs that a processor (e.g., processor 34 or 104) pre-registered as allowed or barred. In some embodiments, the processor may request and receive a user's flight information and, e.g., together with the user's user name and password, may request verification of the user's credentials by an airline company and/or specific details for the flight, including a route and waypoints, against which the user's position data may be checked during the flight.

Figure 3A:
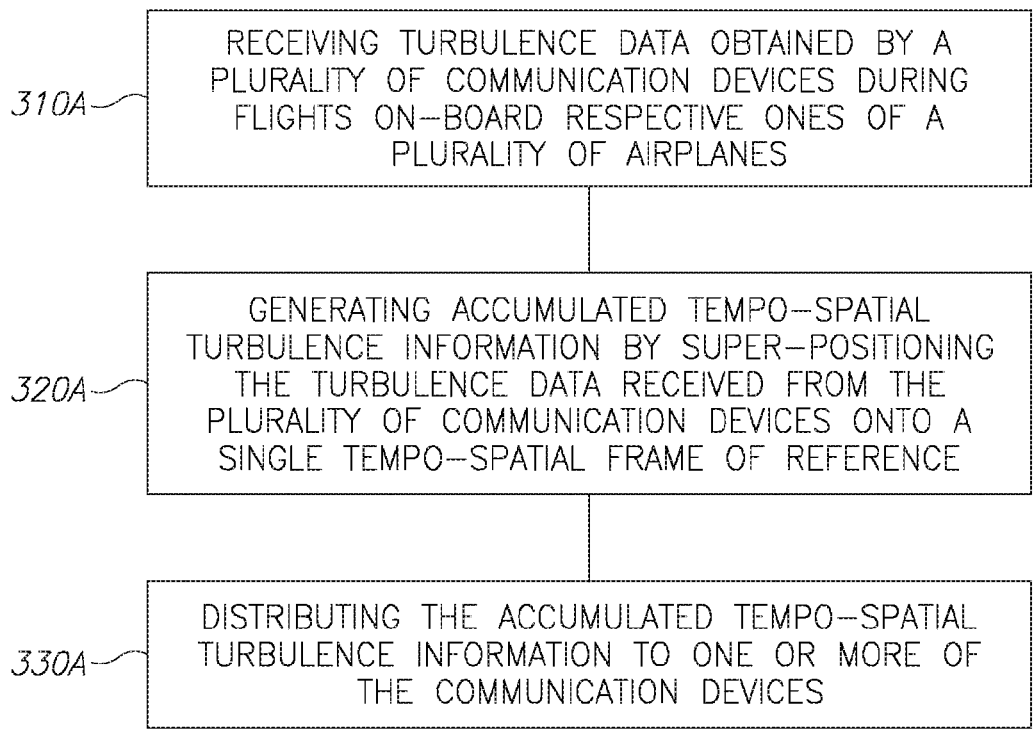
FIG. 3A is a flowchart diagram illustrating a method for monitoring turbulence data in accordance with embodiments of the present invention.

FIG. 3A is a flowchart diagram illustrating a method 300A for monitoring turbulence data in accordance with embodiments of the present invention. Method 300A may be executed using a processor (e.g., server processor 104 of FIG. 2) that is in communication with, and located remotely from, a plurality of in-flight communication devices (e.g., communication devices 30 of FIG. 2).

In operation 310A, a processor (e.g., processor 104 of FIG. 2) may receive turbulence data obtained by a plurality of communication devices (e.g., communication devices 30 of FIG. 2) during flights on-board respective ones of a plurality of airplanes (e.g., airplanes 10A-10F of FIG. 2). Each of the plurality of communication devices may independently receive or record turbulence affecting the airplane in-flight. The communication device may either receive the turbulence data manually, via an input from a human user or automatically, by measuring the temporal acceleration forces applied to the sensors of the communication device.

In operation 320A, the processor may generate accumulated tempo-spatial turbulence information by super-positioning the turbulence data received from the plurality of communication devices onto a single tempo-spatial frame of reference.

In operation 330A, the processor may distribute the accumulated tempo-spatial turbulence data information to one or more of the communication devices.

According to some embodiments of the present invention, the processor may distribute the accumulated turbulence data to be displayed on communication devices. In some embodiments, the processor may divide and distribute flight and turbulence data into segments of time. Each segment may represent a single turbulence level (e.g., in a range of 0-5) and the processor may create a new segment if the processor detects a change in the turbulence level and/or a change in the course/bearing of the flight by more than a predetermined threshold amount (such as, 2 degrees). Each segment may include one or more of: start and end coordinates, start and end altitude, start and end timestamp, and bearing. A segment may have a maximum duration (such as, 15 minutes), for example, to enable the processor to respond to queries that are time based, such as "show turbulence from the past 45 minutes."

According to some embodiments of the present invention, the turbulence data may include, for example, intensity level of the turbulence, geographic or spatial coordinates of the turbulence, trajectory of the flight, altitude of the turbulence and/or time of the turbulence.

Figure 3B:
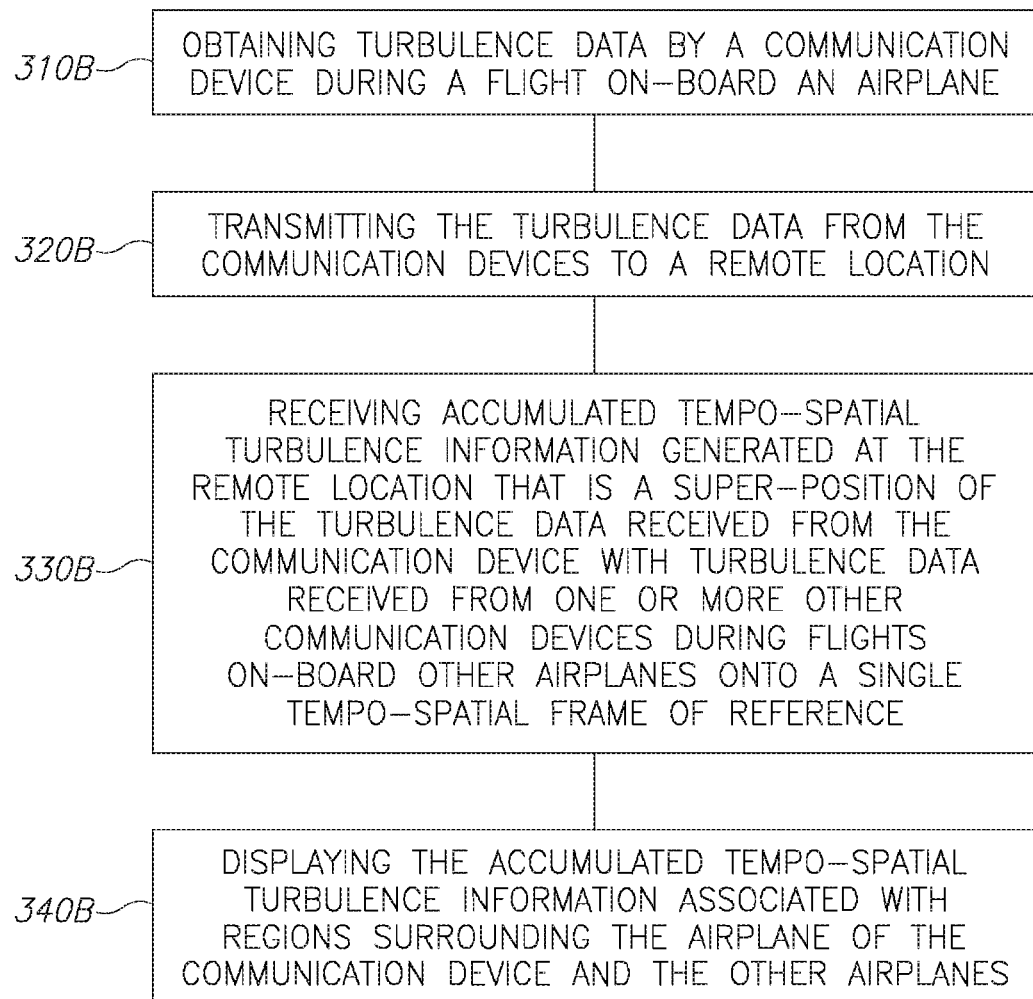
FIG. 3B is a flowchart diagram illustrating a method for obtaining and communicating turbulence data in accordance with embodiments of the present invention.

FIG. 3B is a flowchart diagram illustrating a method 300B for obtaining and communicating turbulence data in accordance with embodiments of the present invention. Method 300B may be executed using a processor (e.g., communication device processor 34 of FIG. 2) that is in communication with, and located remotely from, a centralized processing and distribution location (e.g., server 100 of FIG. 2).

In operation 310B, a processor (e.g., communication device processor 34 of FIG. 2) may obtain turbulence data during a flight on-board an airplane (e.g., airplane 10A of FIG. 2). Each of a plurality of communication devices may independently receive or record turbulence data while the airplane is in-flight. The communication device may either receive the turbulence data manually, via input from a human user or automatically, by measuring the temporal acceleration forces applied to the sensors of the communication device.

In operation 320B, a communication device (e.g., communication device 30 of FIG. 2) may transmit the turbulence data to a remote location (e.g., server 100 of FIG. 2).

In operation 330B, the communication devices (e.g., communication device 30 of FIG. 2) may receive accumulated tempo-spatial turbulence information generated at the remote location (e.g., server 100 of FIG. 2). The accumulated tempo-spatial turbulence information may be a superposition of the turbulence data received from the communication device with turbulence data received from one or more other communication devices during flights on-board other airplanes (e.g., airplanes 10B-10F of FIG. 2) onto a single tempospatial frame of reference (e.g., as generated in operation 320A of FIG. 3A).

In operation 340B, a display (e.g., of communication device 30 of FIG. 2) may display the accumulated tempo-spatial turbulence information associated with regions surrounding or along the route of the airplane of the communication device and/or the other airplanes.

Figure 4:
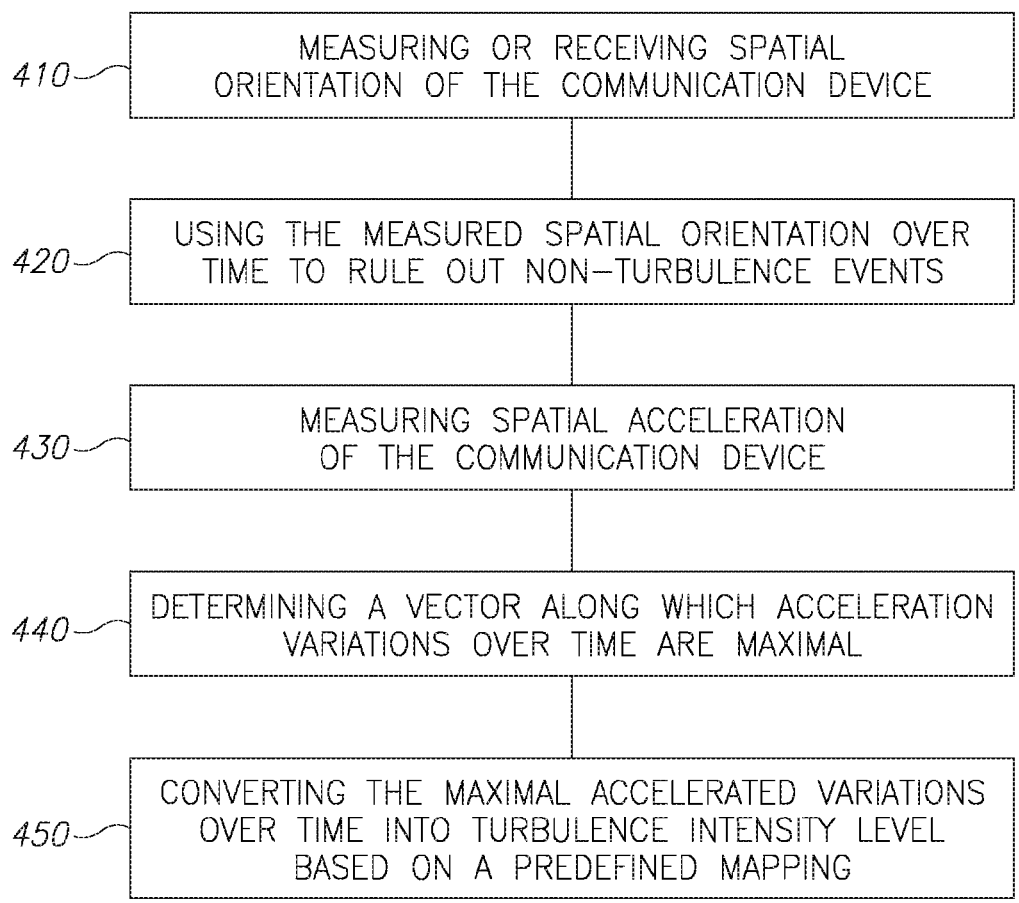
FIG. 4 is a flowchart diagram illustrating a conversion process in accordance with embodiments of the present invention.

According to some embodiments of the present invention, the turbulence data may be generated, for example, by obtaining spatial acceleration data associated with the communication devices, respectively, and converting the spatial acceleration data into turbulence data, based on a conversion process described in reference to FIG. 4.

FIG. 4 is a flowchart diagram illustrating a conversion process 400 in which kinematic data such as acceleration is converted to turbulence values or levels, in accordance with embodiments of the present invention. Process 400 may be executed using a processor (e.g., server processor 104 and/or client device processor 34 of FIG. 2).

In operation 410, a processor (e.g., communication device processor 34 of FIG. 2) may measure or a processor (e.g., server processor 104 of FIG. 2) may receive spatial orientation data of a communication device (e.g., communication device 30 of FIG. 2).

In operation 420, the processor may use the measured spatial orientation data over time to identify turbulence events or rule out non-turbulence events, for example, movement of the communication device independent of and/or relative to the airplane.

In operation 430, the processor may measure spatial acceleration of the communication device during turbulence events.

In operation 440, the processor may determine a vector along which acceleration variations over time are maximal. In some embodiments, in addition or alternatively, the processor may preselect a fixed vector, for example, the vertical vector, with respect to the coordinate space of the airplane and/or the Earth, and determine a maximal acceleration variation along (only) that vector.

In operation 450, the processor may convert the maximal accelerated variations over time into turbulence intensity level based on a predefined mapping.

According to some embodiments of the present invention, the determining of a vector along which variations of the acceleration are maximal (operation 440) may be carried out in order to detect the full effect of the turbulence since turbulence events are characterized with chaotic variations of acceleration, and it may be desirable to detect the full magnitude of the turbulence so as to associate the correct intensity level to the transmitted turbulence data (operation 450). In order to achieve that, the conversion process may include measuring or receiving the spatial orientations of the communication devices (operation 410), respectively, and determining the acceleration variations given the measured spatial orientation (operation 430). It may be the case that the turbulence events are vertical and so some of the orientation measurements are directed at locating the acceleration components along the vertical axis of the aircraft.

According to some embodiments of the present invention, one objective of using the measured spatial orientation over time is to identify turbulence events or rule out non-turbulence events (operation 420). Changes of orientation during non-turbulence events may be due to a user moving the communication device independently of the movement of the airplane. These movements typically have their own motion pattern and their effect may be filtered out from the overall change in acceleration, to provide a correct value of turbulence. In some embodiments, a processor (e.g., communication device processor 34 or remote server processor 104 of FIG. 2) may identify communication device (e.g., communication device 30 of FIG. 2) movements relative to the airplane by measuring rapid changes in device orientation. At any given moment, the processor may request and/or receive information about its orientation in space, for example, including angles along its three axes. When the communication device is at rest (identified by very small changes in the acceleration along all of its axes), the processor measures the angles along its three axes. When the processor identifies that there is a change in one of the angles, it starts measuring the time. When the change stops, the processor checks if one of the angles has changed by more than a predetermined threshold configured value. If the change is higher, the processor checks the speed of the change by measuring the time difference. If the speed is higher than the configured value, the processor may determine that the change is caused by movement of the communication device and not the airplane and may be eliminated as a non-turbulent event.

After a non-turbulent event is detected, if the processor does not detect an ongoing orientation change for at least a predetermined amount of time, the processor may determine that the communication device is at rest again. The processor may reset all turbulence data to no turbulence in a preconfigured period before an identification of a first movement. The processor may also reset all samples of turbulence data after the end of the movement to no turbulence for a preconfigured period. In one example, a communication device may be lying flat causing the processor to detect angles of zero along the X and the Y axes. If a user picks up the communication device and looks at it, this movement may change the angles from zero to about 30-40 degrees along the Y axis over the course of approximately 1 or 2 seconds. The processor identifies the rapid change in angle as a device motion event, not a turbulent event. After the device is at rest for a predetermined threshold of time (e.g., 3 seconds), the processor may clear or cancel turbulence data recorded over a predetermined past time period (e.g., 3 minutes) and/or future time period (e.g., 1 minute). In some cases, for example, if the predetermined past time period is greater than the periodic transmission interval, the communication device may transmit non-turbulent motion data to the remote server before it is identified. The processor may then send the remote server a cancellation signal to delete or ignore non-turbulence data segments. In some embodiments, the processor may recognize when the device is fixed or mounted to the airplane (e.g., releasable secured to a dashboard mount in the cockpit) and may deactivate or skip non-turbulent motion detection processes.

According to some embodiments, additionally or alternatively to the above embodiments, turbulence events may be differentiated from non-turbulence events (operation 420) by comparing turbulence data from multiple communication devices. In one embodiment, a three-dimensional (3D) map may be divided into cells, regions, or "tiles" of airspace above geographic regions of the Earth. Tiles may be 3D shapes (e.g., when viewed in perspective) or 2D shapes (e.g., when viewed along constant altitude cross-sections, constant latitude cross-sections or constant longitude cross-sections). In one example, the airspace map may be divided into cubic (3D) or square (2D) tiles that vary in size depending on latitude (lower latitude tiles having smaller dimensions, such as, $15^3$ miles, and higher latitude tiles having larger dimensions, such as, $35^3$ miles). In other embodiments, tiles may have a cylindrical (3D) or circular (2D) shape, rectangular prism (3D) or rectangular (2D) shape, or any other shape. The sizes, dimensions or aspect ratios of the tiles may be fixed or set as an adjustable parameter for higher or lower turbulence data resolution. Turbulence data may be constant across each tile and may be defined by discrete values (such as levels 0-5) or continuous values. Turbulence data may be visualized on the turbulence map by a color corresponding to the discrete or continuous value. Each communication device records turbulence values for the tile representing the region in which it is located, for example, assigning values or "coloring" the tiles along its trajectory.

Embodiment of the invention may be used to correct "false positive" turbulence events (e.g., detecting turbulence when there is none, or detecting a higher level of turbulence than exists). False positives may occur, for example, when the recording device moves independently relative to the airplane (e.g., the device velocity being different than the airplane velocity ($V_{device} \neq V_{airplane}$) and its independent motion mimics airplane turbulence). False positives may be caused, for example, by human motion, typing or playing games with the device, dropping the device, jostling the device or otherwise moving the device during a flight. Embodiments of the invention recognize that, whereas false positive turbulent events are possible, "false negative" turbulent events are rare or impossible. During turbulence, it is difficult or impossible to stabilize a device to decrease or negate turbulence. That is, one cannot fake smooth motion when turbulence exists. Embodiments of the invention utilize this understanding by prioritizing or selectively reporting lower turbulence measurements over higher turbulence measurements.

A process (e.g. operation 420) or a processor (e.g. processor 34 and/or 104) may set the turbulence value in each region or tile to be the lowest or minimum reported turbulence value detected by all communication devices on-board one or more airplanes traveling through that region within a predetermined period of time. In some embodiments, the process or processor may selectively update a region's turbulence value(s), for example, only decreasing the value if a lower value is subsequently reported, but not increasing this minimum value, within a black-out or lock-out period of time (e.g. 1-30 minutes). In some embodiments, the process or processor may wait until the expiration of the lock-out time period and set the turbulence value for the airspace region to be the minimum reported value for that region within the lock-out time period. In some embodiments, the process or processor may determine the turbulence value for the airspace region based on an absolute or weighted average of the reported values for that region within a predetermined time period. The weighted average may assign relatively higher weights to relatively lower turbulence values and relatively lower weights to higher turbulence values. In another embodiment, the turbulence value may be averaged based on a subset of reported values for that region, for example, averaging only values that are within a predetermined range of the lowest (or middle) reported turbulence value for that region within a predetermined time period.

The duration of the lock-out time period may be preset/fixed or adjustable/dynamic. The duration of the lock-out time period, for example, may be commensurate with an amount of time in which air patterns change and may he a static preset duration of typical or average air pattern changes or may be dynamic, for example, altered based on real-time weather patterns.

According to some embodiments, the process or processor may selectively correct turbulence events, only updating turbulence events that decrease (not increase) turbulence values for the same airspace region within the period of time. For example, a first airplane that crosses an airspace region during the period of time, may have an on-board communication device that detects a turbulence value (such as, level 3 turbulence). The turbulence value for that airspace region may be set (e.g. to level 3, indicated by a corresponding color on the turbulence map) instantly or upon the expiration of the time period. If a second airplane crosses the airspace region and has an on-board communication device that records a lower turbulence value (such as, level 1 turbulence) than is recorded on-board the first airplane, the process or processor may lower or reduce the first airplane's higher value with the second airplane's lower value for that airspace region. If however the communication device on-board the second airplane records a turbulence value greater than (or equal to) the first airplane's turbulence value (such as, level 5 turbulence), the second airplane's greater (or equal) value will be ignored and not override the first plane's lower value. The override instructions may be executed by processor or for the process, for example, as:

For two or more turbulence values measured by two or more communication devices on two or more respective airplanes (or on-board the same airplane) in the same airspace region within a predetermined period of time:

if a second turbulence value measured by one communication device at a second later time is greater than or equal to a first turbulence value measured by a different communication device at a first previous time, do not override the first turbulence value (ignore the second turbulence value);

if the second turbulence value is less than the first turbulence value, override the first turbulence value with the second turbulence value;

if the second turbulence value is equal to the first turbulence value, validate the first turbulence value or do nothing.

Accordingly, embodiments of the invention may benefit from multiple communication devices serving to validate or override each other's turbulence data. The multiple communication devices may be on-board different airplanes or on-board the same (single) airplane.

A single device may also override its own turbulence measurements. For example, during a period of time within the same airspace region, a single communication device may detect or report multiple turbulence measurements. The process or processor may only accept a minimum of these measurements and ignore all greater than or equal measurements (if all measurements are received at once) or may selectively update the turbulence value for the region if (e.g., and only if) a subsequently measured value is less than a previously measured value (if the measurements are reported or detected sequentially).

In some embodiments of the invention, the period of time may be constant (e.g. resetting every preset number of minutes). In other embodiments of the invention, the period (s) of time may reset upon each new measurement (e.g., lasting a preset duration from the most recent recording).

According to some embodiments of the present invention, obtaining the turbulence data may be executed responsive to manual input by respective users of the communication devices. In such embodiments, a user (e.g., a pilot) may report turbulence as they experience it. In further embodiments, the manual input may include additional data relating to potential flight disturbances other than turbulence, such as cloud coverage or wind shear.

Figure 5:
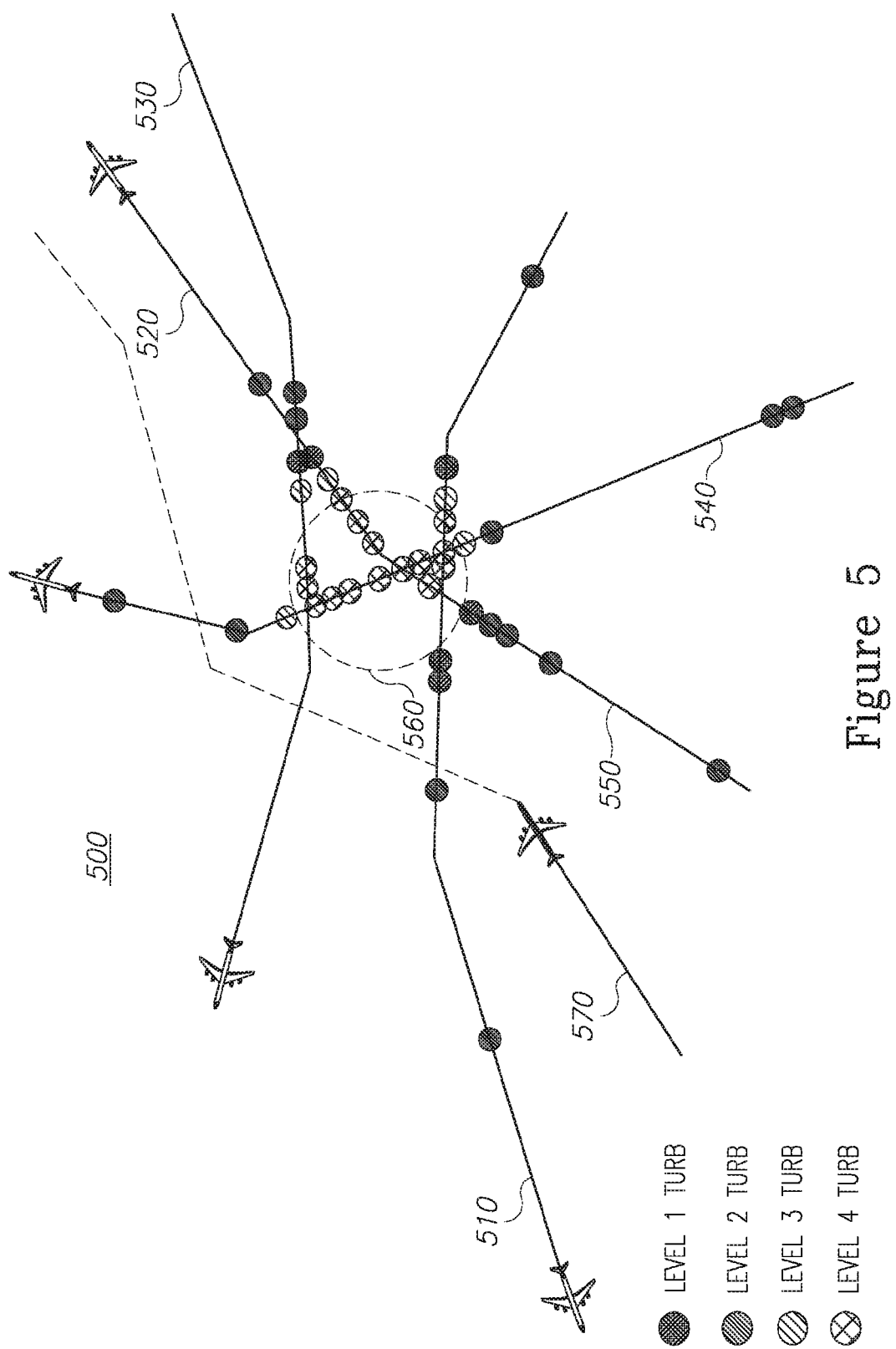
FIG. 5 is a schematic diagram illustrating a plurality of turbulence data samples obtained during several flight routes used to derive coverage of a specific area of turbulence data in accordance with embodiments of the present invention.

FIG. 5 is a schematic diagram illustrating a plurality of turbulence data samples obtained during several flight routes used to derive turbulence data covering a specific area in accordance with embodiments of the present invention. FIG. 5 shows a map 500 of five different flight routes 510-550 representing flights during which turbulence data was collected according to embodiments described herein. Region 560 shows turbulence data accumulated from the various flight routes 510-550 so as to provide turbulence data over a larger area than would be provided using a single flight route. In the example of FIG. 5, region 560 contains turbulence data samples indicating "level 4" turbulence. The turbulence data regarding region 560 may be used by a pilot of the airplane on route 570 (solid line) to divert to an alternative route (broken line) and thus avoid turbulent area 560.

According to some embodiments of the invention, a processor (e.g. processor 34 and/or 104) may use turbulence data from multiple communication devices in different planes (or within a single airplane) within the same airspace region to validate or override each other's measurements, for example, to avoid "false positive" turbulence data. In the example in FIG. 5, if subsequent to flight 520 recording a turbulence value (e.g. level 4) in region 560, flight 570 traversed region 560 and recorded a lower turbulence value (e.g. level 3) than flight 520, the processor would update the turbulence value for region 560 to be the lower of the multiple turbulence values (e.g. level 3). If however, flight 570 recorded a greater (or equal) turbulence value than flight 520 (e.g. level 5), the processor would ignore the flight 570 measurement.

In some embodiments, turbulence data from various flights may be used to validate the turbulence samples coming from proximal locations and sample times of the data. It should be understood that a plurality of flights may be used to collect turbulence data, which is used to update the database at the remote server, for both accumulating and further analysis as will be explained below.

Figure 6:
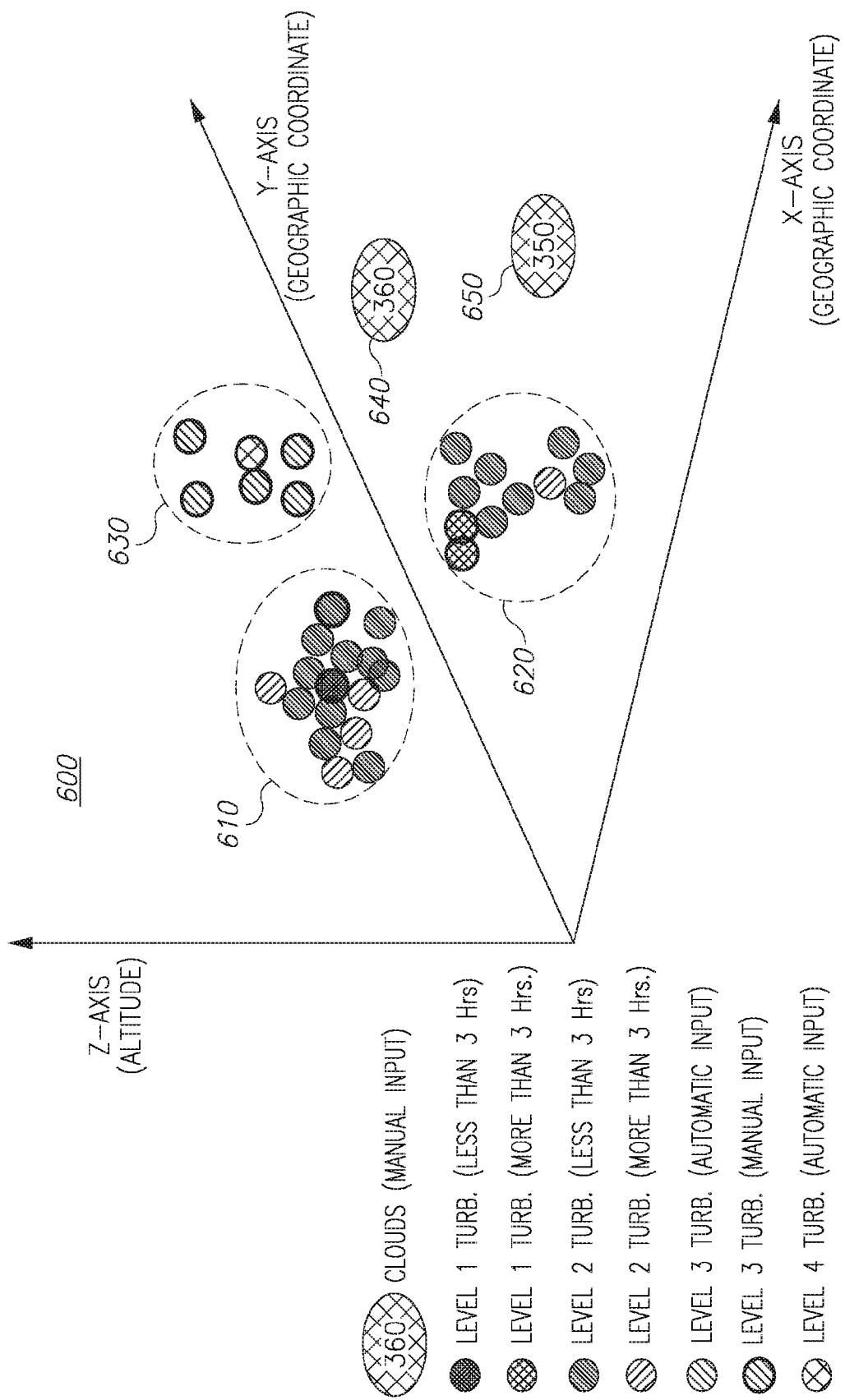
FIG. 6 is a graph diagram for super-positioning turbulence data received from a plurality of communication devices in accordance with embodiments of the present invention.

FIG. 6 is a graph diagram 600 for super-positioning turbulence data received from a plurality of communication devices in accordance with embodiments of the present invention. Graph 600 may represent data in the form of a three dimensional array with axes x and y representing latitude and longitude geographic coordinates and the z axis representing altitude. As turbulence data is received, the data may be mapped onto a common frame of reference, possibly in clusters of samples 610, 620, and 630 each representing turbulence data from a plurality of flights proximal to each other either in space or in time. Each sample is associated with several attributes such as turbulence intensity, altitude, and time of collection.

Other non-turbulence data, such as, cloud coverage or visibility 640 and 650 may be stored. The legend at the lower left corner of FIG. 6 shows example and non-limiting attributes that may be associated with the turbulence data samples.

Figure 7:
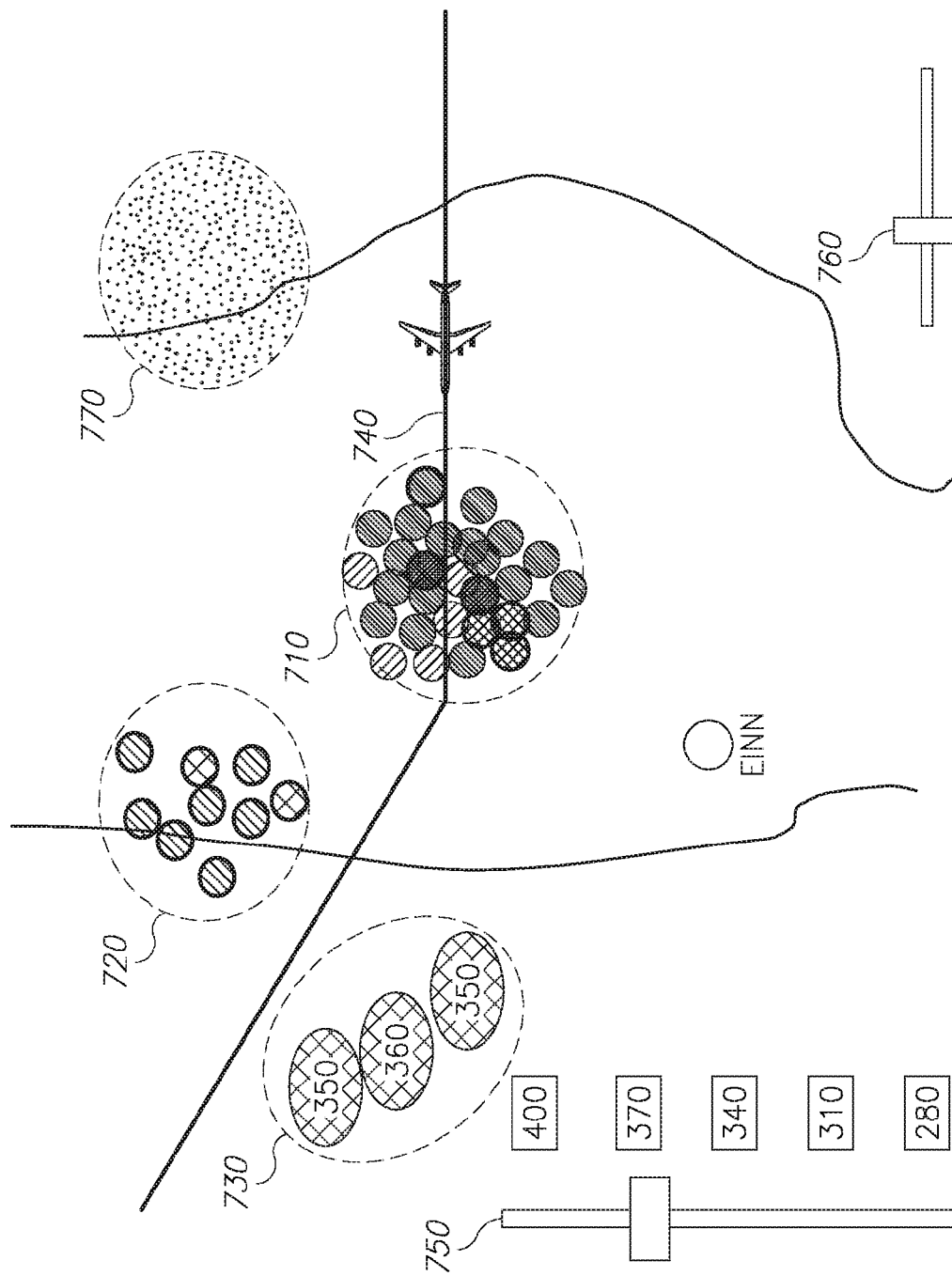
FIG. 7 is map diagram illustrating a visual representation of turbulence data in accordance with embodiments of the present invention.

FIG. 7 is a map diagram illustrating a visual representation of turbulence data in accordance with embodiments of the present invention. The map diagram may be generated based on the data distributed by a remote server (e.g., server 100 of FIG. 2) and may be displayed on one or more communication device (e.g., communication devices 30 of FIG. 2). In the example of FIG. 7, flight route 740 is shown as entering a cluster of visual indicators 710 all of low level turbulence while avoiding a cluster 720 of high level turbulence. A volcanic ash area 770, possibly identified by third party sources, and cloud coverage 730, with their respective altitude indicated, may also be displayed.

Figure 8:
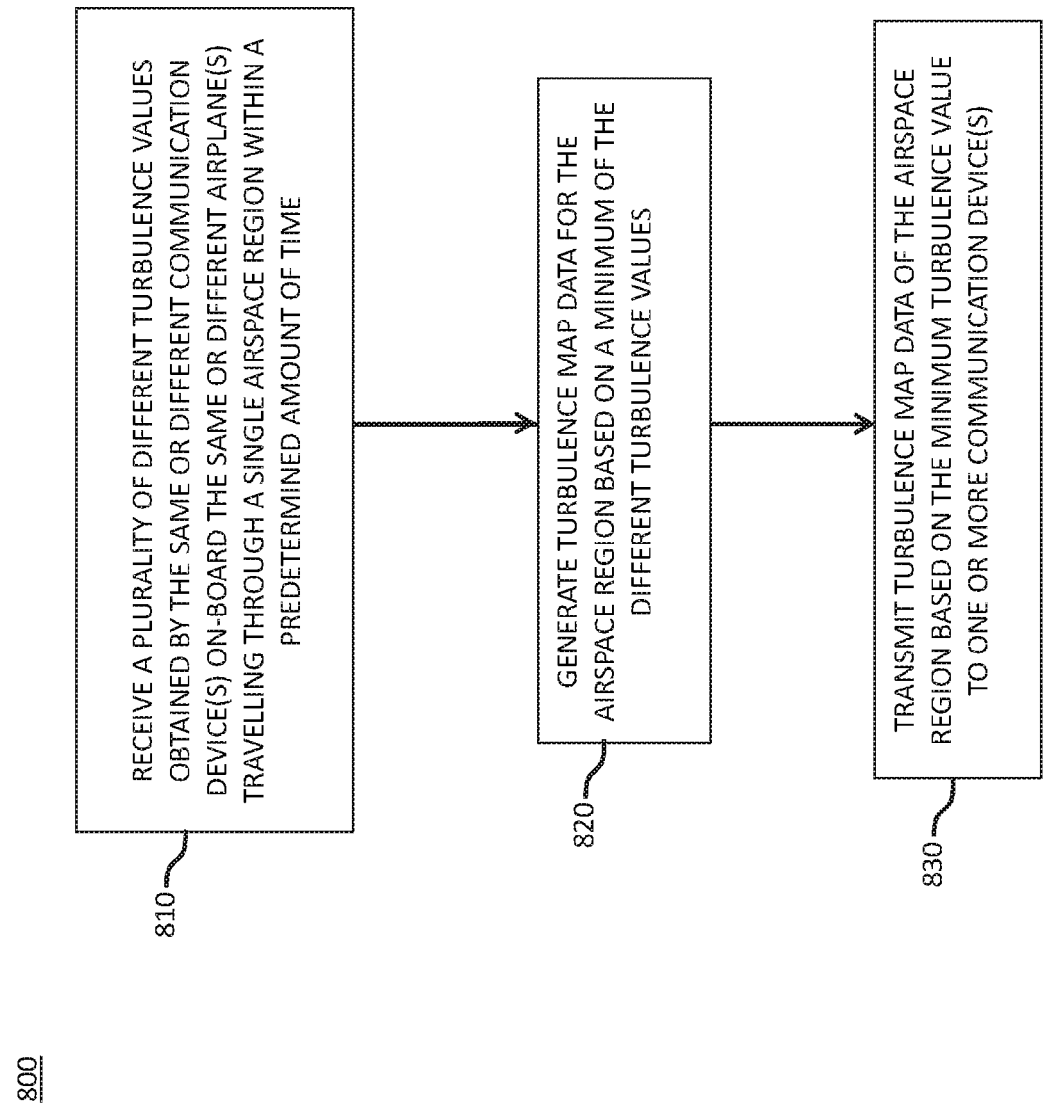
FIG. 8 is a flowchart diagram illustrating a method for correcting "false positive" turbulence events in accordance with embodiments of the present invention.

FIG. 8 is a flowchart diagram illustrating a method 800 for avoiding or correcting "false positive" turbulence events in accordance with embodiments of the present invention. Method 800 may be executed using a processor (e.g., server processor 104 of FIG. 2).

In operation 810, a processor (e.g., server processor 104 of FIG. 2) may receive a plurality of different turbulence values obtained by one or more communication devices (e.g., communication device 30 of FIG. 2) during flights on-board one or more airplanes (e.g., airplane 10A-F of FIG. 2) travelling through a same airspace region (e.g., region 560 of FIG. 5) within a predetermined amount of time (e.g., lock-out time period). The plurality of turbulence values may be received as sequential readings from a single communication device on-board a single airplane, from different communication device on-board the same airplane, or from different communication devices on-board respective ones of a plurality of different airplanes. Prior to operation 810, if no turbulence value has been recorded for the airspace region within a predetermined period of time, the processor may set the turbulence value or level for the airspace region based on the turbulence value received in operation 810, for example, instantly or upon expiration of the predetermined time period.

In operation 820, a processor (e.g., server processor 104 of FIG. 2) may generate turbulence map data for the airspace region based on a minimum of the different turbulence values received in operation 810. In one embodiment, the processor may set the turbulence value for the airspace region to be the minimum value received during the predetermined period of time and may, for example, based only on minimum turbulence values, ignore any non-minimum turbulence values. In one embodiment, the processor may selectively update the turbulence value for the airspace region by only decreasing the turbulence value if a lower value is subsequently received, but not increasing the turbulence value if a higher value is subsequently received, within the predetermined period of time. In one embodiment, the processor may wait until expiration of the predetermined period of time and set the turbulence value for the airspace region to be the minimum of the turbulence values. For example, if the processor has already set the turbulence value for the airspace region to be a first higher turbulence value, the processor may reduce the turbulence value assigned to the airspace region to be equal to, or a derivative of, a subsequently received relatively lower turbulence value. If no turbulence value has been set for the airspace region within the predetermined period of time, the processor may select the minimum turbulence value, i.e., the subsequent lower value, to be the turbulence value for the airspace region, and may ignore or delete the previously received higher turbulence value. In one embodiment, the processor may generate the turbulence map data based on an average of all or a subset of the plurality of turbulence values, for example, that are within a predetermined range of the minimum of the turbulence values. The average may be a weighted average in which relatively higher weights are assigned to relatively lower turbulence values and relatively lower weights are assigned to relatively higher turbulence values. In some embodiments, the subset of turbulence values may exclude a maximum turbulence value.

In operation 830, a processor (e.g., server processor 104 of FIG. 2) may transmit the turbulence map data of at least the single airspace region based on the minimum turbulence values generated in operation 820 to one or more communication device(s) (e.g., the same or different as the communication devices from which the turbulence values are received in operation 810). Communication device(s) may display the turbulence map data associated with regions surrounding or along the route of the airplane of the communication device and/or the other airplanes.

According to some embodiments of the present invention, the visual representation may include a plurality of indicators superimposed on a map according to the respective locations at which the turbulence data was obtained or recorded.

According to some embodiments of the present invention, the indicators visually distinguish between various levels of turbulence intensity. This may be implemented, as shown here by using a predefined color, pattern or icon scheme. The same scheme may be used for all communication devices or different schemes may be used or changed for different respective communication devices.

According to some embodiments of the present invention, the indicators may further visually distinguish between at least one of: sample time of the turbulence data, and whether or not the turbulence data was obtained manually or by measuring acceleration of the respective communication devices.

According to some embodiments of the present invention, the visual representation may be altered responsive to user selection, for example, to only show the indicators of a specified altitude range, within a specified radius or flight route, or within a specified period of time.

According to some embodiments of the present invention, the visual representation may be altered, possibly using a graphical user interface (GUI) responsive to user selection, to only show the indicators of a specified level or range of turbulence level, or a specified altitude range (a non-limiting example may include GUI bar 750) or a specified time range (a non-limiting example may include GUI bar 760).

Although the network connection between the communication devices and the remote server may be continuous, according to some embodiments of the present invention, in a case that at least some of communication devices cannot temporarily establish a communication channel with the remote location, or in a case that no communication is available throughout the entire flight, the transmitting of the turbulence data by the at least some of communication devices may be delayed to when the communication channel becomes available (e.g., when an airplane access point is activated in flight or after landing upon gaining access to a communication network). At that time, turbulence data from the entire flight or only time periods when a connection was unavailable, may be transmitted to the server. The server may apply the past turbulence data to show turbulence in areas along flight paths where other airplanes are currently or are projected to pass.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method comprising:
    receiving a plurality of turbulence values obtained by one or more communication devices during flights on-board one or more airplanes while travelling through a single airspace region within a predetermined period of time, wherein at least two of the turbulence values are different;
    generating turbulence map data for the airspace region based on a minimum of the different turbulence values, and not based on a non-minimum of the different turbulence values; and
    transmitting to one or more communication devices the turbulence map data of at least the airspace region based on the minimum of the turbulence values.

2. The method of claim 1, wherein the plurality of turbulence values are received from a single communication device on-board a single airplane.

3. The method of claim 1, wherein the plurality of turbulence values are received from a plurality of respective communication devices on-board a single airplane.

4. The method of claim 1, wherein the plurality of turbulence values are received from a plurality of respective communication devices each on-board a different respective one of a plurality of airplanes.

5. The method of claim 1, wherein the turbulence map data for the airspace region is generated based only on minimum turbulence values.

6. The method of claim 1 comprising selectively updating the turbulence value for the airspace region by only decreasing the turbulence value if a lower value is subsequently reported, but not increasing the turbulence value, within the predetermined period of time.

7. The method of claim 1 comprising waiting until expiration of the predetermined period of time and setting the turbulence value for the airspace region to be the minimum of the plurality of turbulence values.

8. The method of claim 1 comprising generating the turbulence map data based on an average of the plurality of turbulence values.

9. The method of claim 8, wherein the average is weighted by assigning relatively higher weights to relatively lower turbulence values and relatively lower weights to relatively higher turbulence values.

10. The method of claim 1 comprising generating the turbulence map data based on a subset of turbulence values obtained by a plurality of the one or more communication devices excluding a maximum turbulence value.

11. The method of claim 1 comprising generating the turbulence map data based on a subset of turbulence values that are within a predetermined range of the minimum of the turbulence values.

12. The method of claim 1, wherein the turbulence value for the airspace region is set immediately upon receiving each new minimum turbulence value.

13. The method of claim 1, wherein the turbulence value for the airspace region is set upon the expiration of the predetermined period of time.

14. The method of claim 1, wherein the turbulence map data is generated based on turbulence values for each of a plurality of tiles dividing a three-dimensional (3D) map of airspace regions above the Earth.

15. A device comprising:
    a processor;
    memory; and
    one or more instructions stored in the memory and executable by the processor, which, when executed, configure the processor to:
        receive a plurality of turbulence values obtained by one or more communication devices during flights on-board one or more airplanes while travelling through a single airspace region within a predetermined period of time, wherein at least two of the turbulence values are different,
        generate turbulence map data for the airspace region based on a minimum of the different turbulence values, and not based on a non-minimum of the different turbulence values, and
        transmit to one or more communication devices the turbulence map data of at least the airspace region based on the minimum of the turbulence values.

16. The device of claim 15, wherein the processor is configured to receive the plurality of turbulence values from a single communication device on-board a single airplane.

17. The device of claim 15, wherein the processor is configured to receive the plurality of turbulence values from a plurality of respective communication devices on-board a single airplane.

18. The device of claim 15, wherein the processor is configured to receive the plurality of turbulence values from a plurality of respective communication devices each on-board a different respective one of a plurality of airplanes.

19. The device of claim 15, wherein the processor is configured to generate the turbulence map data based only on minimum turbulence values for the airspace region.

20. The device of claim 15, wherein the processor is configured to selectively update the turbulence value for the airspace region by only decreasing the turbulence value if a lower value is subsequently reported, but not increasing the turbulence value, within the predetermined period of time.

21. The device of claim 15, wherein the processor is configured to wait until expiration of the predetermined period of time and set the turbulence value for the airspace region to be the minimum of the plurality of turbulence values.

22. The device of claim 15, wherein the processor is configured to generate the turbulence map data based on an average of the plurality of turbulence values.

23. The device of claim 22, wherein the processor is configured to weight the average by assigning relatively higher weights to relatively lower turbulence values and relatively lower weights to relatively higher turbulence values.

24. The device of claim 15, wherein the processor is configured to generate the turbulence map data based on a subset of turbulence values obtained by a plurality of the one or more communication devices excluding a maximum turbulence value.

25. The device of claim 15, wherein the processor is configured to generate the turbulence map data based on a subset of turbulence values that are within a predetermined range of the minimum of the turbulence values.

26. The device of claim 15, wherein the processor is configured to set the turbulence value for the airspace region immediately upon receiving each new minimum turbulence value.

27. The device of claim 15, wherein the processor is configured to set the turbulence value for the airspace region upon the expiration of the predetermined period of time.

28. The device of claim 15, wherein the processor is configured to generate the turbulence map data based on turbulence values for each of a plurality of tiles dividing a three-dimensional (3D) map of airspace regions above the Earth.

* * * * *